Oct. 10, 1933. O. BARNACK 1,930,432
DISTANCE METER FOR PHOTOGRAPHIC PURPOSES
Filed Aug. 17, 1932
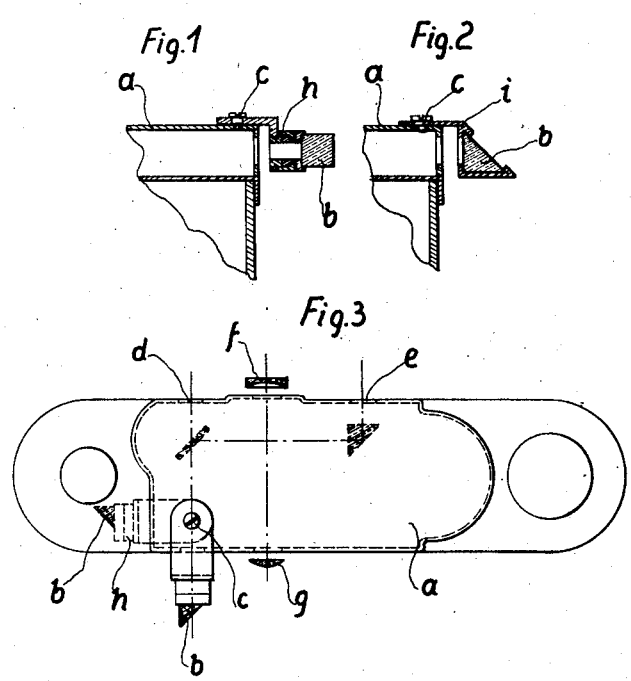
INVENTOR
Oskar Barnack
BY
ATTORNEY Patented Oct. 10, 1933

1,930,432

UNITED STATES PATENT OFFICE 1,930,432

DISTANCE METER FOR PHOTOGRAPHIC PURPOSES

Oskar Barnack, Wetzlar, Germany, assignor to Ernst Leitz, Optische Werke, G. m. b. H., Wetzlar, Germany Application August 17, 1932, Serial No. 629,116, and in Germany September 10, 1931

5 Claims. (Cl. 88—2.6)

This invention relates to improvements in cameras, and particularly in the distance meters of said cameras, and it is the principal object of my invention to provide a distance meter the base of which is formed by two reflection elements between which a finder is arranged.

Another object of my invention is the provision of a finder arrangement allowing a camera to be built as low as possible, and to avoid elevated parts projecting above the camera, and thus permitting the use of all available space for the arrangement of photographic accessories.

A further object of my invention is the provision of a finder within the distance meter casing or in front of corresponding openings in said casing.

A still further object of my invention is the provision of a camera with a reflection prism allowing an inspection of the distance meter from the side and from above as the customary inspection of the distance meter is effected parallel to the optical axis of the finder.

These and other objects and advantages of my invention will become more fully known as the description thereof proceeds, and will then be more specifically defined in the accompanying claims.

In the accompanying drawing forming a material part of this disclosure:

Fig. 1 is a fragmentary sectional elevation of a distance meter equipped with a prism holder and constructed according to my invention.

Fig. 2 is a modified form of prism holder.

Fig. 3 is a plan view of a camera equipped with a distance meter and finder constructed according to my invention.

As illustrated, the casing $a$ of a distance meter has a reflection prism $b$ attached thereto held in a sleeve $h$ secured to the casing by means of a hinge connection $c$, or a seat $i$ for the prism $b$ is secured to the casing $a$ by means of a screw $c$.

As shown in Figure 3, between the reflection elements $e$, $d$, of the distance meter $a$ is arranged a finder $f$, $g$.

In operation, the distance meter and finder will enable a convenient reading of the distance meter from the side or from the top according to the position of the prism.

It will be understood that I have described and shown the preferred form of my device only as example of the many possible ways to practically construct the same, and that I may make such changes in its arrangement as come within the scope of the appended claims without departure from the spirit of my invention, and the principles involved.

Having thus described my invention, what I claim as new and desire to secure by Letters Patent is:

1. In a photographic camera, a distance meter basis, a reflection prism arranged in front thereof, and means for rotating said reflection prism to enable a convenient reading of the distance meter from the side or the top of the camera.

2. In a photographic camera a distance meter basis a housing, a prism having a holder, and means for hingedly connecting said prism holder to the housing of the distance meter to enable a convenient reading of the distance meter from the side or the top of the camera.

3. In a photographic camera, a distance meter basis, a housing, a reflection prism in a sleeve holder, and means for turnably securing said holder to said housing to enable a convenient reading of the distance meter from the side or the top.

4. In a photographic camera, a distance meter basis, a housing, a reflecting prism, and a seat for said prism, and means for turnably connecting said seat to said housing to enable a convenient reading of the distance meter from the side or the top.

5. In a photographic camera a distance meter comprising a housing, two reflection elements, and a finder telescope between said elements so arranged that the optical axis of the finder is crossing the optical axis of the distance meter, and a prism holder hingedly connected to the housing of the distance meter to enable a convenient reading of the distance meter either from the side or the top.

OSKAR BARNACK.